UNITED STATES PATENT OFFICE.

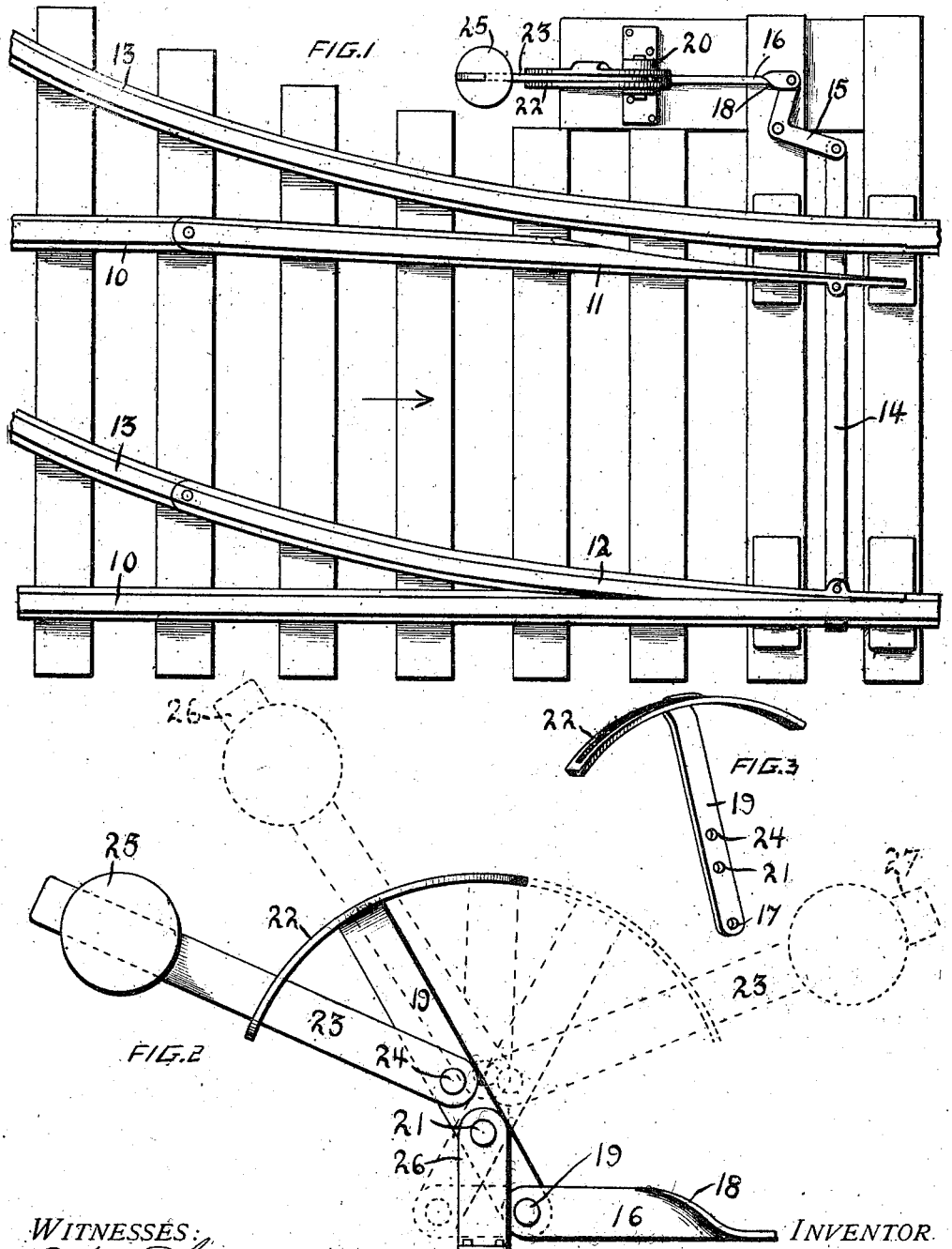

CHARLES A. DUSCH, OF WATSON, WEST VIRGINIA.

SWITCH-LEVER.

989,585.

Specification of Letters Patent. Patented Apr. 18, 1911.

Application filed November 14, 1910. Serial No. 592,322.

*To all whom it may concern:*

Be it known that I, CHARLES A. DUSCH, a citizen of the United States, residing at Watson, county of Marion, State of West Virginia, have invented certain new and useful Improvements in Switch-Levers, of which the following is a specification, reference being had therein to the accompanying drawing.

This invention relates to a switch lever and particularly to a construction by which the operating lever retains the switch lever in its shifted positions.

The invention has for an object to provide a switch stand having a pivoted switch lever mounted therein and an operating lever pivoted upon said switch lever and mounted to engage and shift said switch lever when the operating lever is shifted to the opposite limits of its travel.

Other and further objects and advantages of the invention will be hereinafter set forth and the novel features thereof defined by the appended claims.

In the drawing—Figure 1 is a plan showing the application of the invention to a switch; Fig. 2 is an enlarged side elevation of the switch stand; and Fig. 3 is a detail perspective of the switch lever.

Like numerals of reference refer to like parts in the several figures of the drawing.

The numeral 10 indicates the main track rails which are provided with the switch points 11 and 12 while the switch track rails are indicated at 13. The switch points 11 and 12 are connected by the bar 14 which is pivoted to one arm of a crank lever 15, the other arm thereof being pivoted to a bar 16 which is pivotally connected at 17 with the switch lever. This bar may be of any desired construction but is preferably formed from a plate having one end bent at a right angle to the other at the portion 18 thereof. The switch lever 19 is mounted in the stand 20 by means of the pivot 21 and is provided at its upper end with the sector 22 which is here shown as comprising a slotted plate within which the operating lever 23 is disposed and adapted to travel. This operating lever is pivotally mounted at 24 upon the switch lever 19 and provided with a weight 25 at its free end in order to retain it in either of its shifted positions.

In the operation of the invention, with the parts in the position shown in Fig. 1, the passage of a train or car through the switch causes the switch stand and lever to be raised to the position shown by dotted lines at 26 owing to the pressure upon the switch point 12 and as soon as this pressure is relieved, the weight upon the operating lever immediately restores the parts to the position shown in Fig. 1. If it be desired to shift the switch so that the main line tracks will be in position for use, if a car approaches from the right of Fig. 1, the operating lever is thrown toward the right end of the switch lever and the weight thereon, having passed the center of the stand 20, causes both the switch and operating levers to be shifted to the positions shown by dotted lines at 27 in Fig. 2. This construction permits a motor and cars to run through the switch in a direction opposite to the points thereof without shifting the switch and obviates the use of springs for restoring the switch to its original position while securing the advantages of a yielding switch. The mounting of the switch and operating levers permits the shifting of the switch and maintains it in its shifted position so that pressure upon the switch points cannot shift the switch but a manual operation of the operating lever is necessary in order to change the center of gravity of both this lever and the switch lever upon which it is mounted. It will therefore be seen that the invention presents a simple, efficient and economical form of switch lever particularly adapted for application to mining and similar track construction.

Having described my invention and set forth its merits, what I claim and desire to secure by Letters Patent is—

1. In a switch stand, a switch lever pivotally mounted thereon and provided with a segmental slotted plate at its upper end, an operating lever extended through said plate and pivoted upon said switch lever, and means connected with the lower end of said switch lever for operating a switch.

2. In a switch stand, a post, a switch lever mounted thereon and provided with a segmental slotted plate at its upper end, a switch connection from the lower end of said lever, and an operating lever pivoted to said switch lever above its supporting post and adapted to travel within the slotted plate carried thereby.

3. In a switch stand, a post, a switch lever mounted thereon and provided with a segmental slotted plate at its upper end, a switch connection from the lower end of said lever, an operating lever pivoted to said switch lever above its supporting post and adapted to travel within the slotted plate carried thereby, and a weight carried by the upper end of said switch lever.

In testimony whereof I affix my signature in presence of two witnesses.

CHARLES A. DUSCH.

Witnesses:
GEORGE F. DUSCH,
FRANK HAYDEN.